Jan. 20, 1948. T. L. FAWICK 2,434,762
ASSEMBLY FOR BRAKES AND CLUTCHES
Filed Sept. 22, 1945

INVENTOR
Thomas L. Fawick
BY Willard D. Eakin
ATTORNEY

Patented Jan. 20, 1948

2,434,762

UNITED STATES PATENT OFFICE 2,434,762

ASSEMBLY FOR BRAKES AND CLUTCHES

Thomas L. Fawick, Akron, Ohio, assignor to The Fawick Airflex Company, Inc., a corporation of Indiana Application September 22, 1945, Serial No. 618,019

8 Claims. (Cl. 188—152)

This invention relates to an assembly suitable for use as a clutch or a brake and comprising a fluid-distensible actuating member.

Its chief objects are to provide an assembly adapted for economy of manufacture; to provide facility of assembly and disassembly; to provide simplicity of construction; and to provide in an improved manner for controlling the range of movement of wear shoes which are a part of the assembly.

Referring to the drawings.

Figure 1:
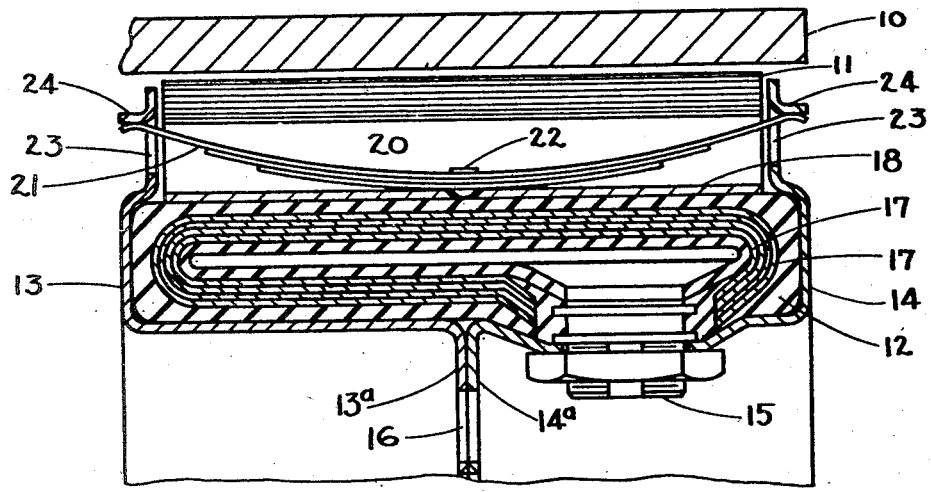
Fig. 1 is a fragmentary axial section of an assembly embodying my invention in its preferred form.
Figure 2:
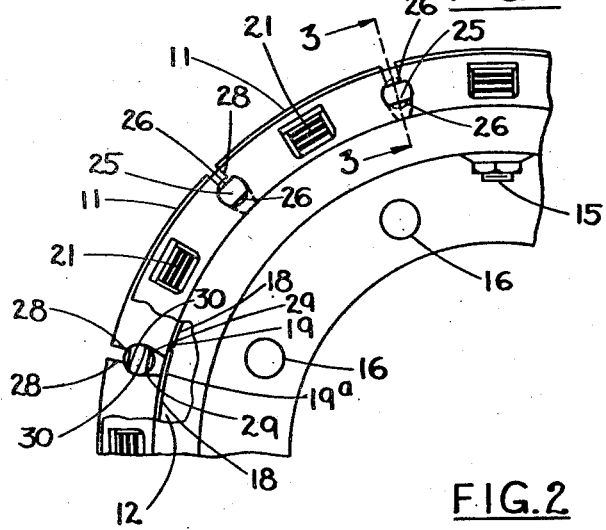
Fig. 2 is a fragmentary elevation of the same, on a smaller scale.
Figure 3:
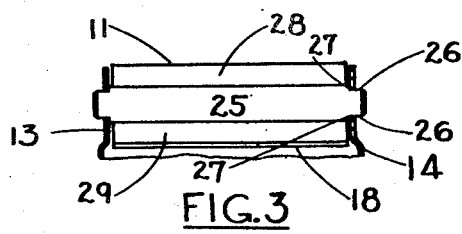
Fig. 3 is a section on line 3—3 of Fig. 2.

Referring to the drawings, the assembly comprises, in the present embodiment, a brake-drum or clutch member 10 having an internal frictional engagement face and, for coaction therewith, a circumferentially arranged set of wear shoes 11, 11 adapted to be forced outward into frictional engagement with the member 10 by a fluid-distensible annular bag 12 which is seated on and between a pair of annular metal members or half-rims 13, 14. The member 14 is formed with a hole for a stem or nipple 15 for conducting distending fluid into and out of the bag and the two members 13 and 14 are formed with respective annular, inwardly projecting radial flanges 13a, 14a which abut each other at the middle plane of the assembly and are formed with a circumferentially spaced set of registered bolt holes 16, 16 for attachment to a hub member.

The bag 12 is formed of rubber or the like, reinforced by transversely disposed cords 17, 17.

Each of the wear shoe assemblies comprises an arcuate block 11 of frictional, heat-resistant material and a metal base plate 18 secured as by adhesion to its inner face and projecting beyond one of its ends, as at 19a, but terminating short of its other end, as at 19.

Midway of its length each of the blocks 11 is formed with a transverse groove 20 in its inner face, next to the base plate 18, to accommodate a multiple-leaf spring 21 of which the leaves are secured together at the middle of the spring by a rivet 22 one head of which seats in a dimple formed in the adjacent face of the base plate, to position the spring with relation to the base plate 18 and its friction block 11. At each of its ends the spring extends outward through a hole 23 formed in the adjacent flange portion of the half-rim member 13 or 14, and the end portion of the spring bears at all times with substantial force against an ear 24 bent out from the material of the member 13 or 14 at the radially outer side of the hole 23, the springs thus urging the wear shoe assemblies away from the brake-drum or clutch member 10 at all times.

Mounted in alternation with the wear shoe assemblies is a set of torque-sustaining, generally cylindrical bars 25, 25, each of which is interposed between the ends of the adjacent friction blocks 11 and has each of its ends formed with diametrically opposite flats 26, 26 and mounted in a complemental hole formed in the adjacent half-rim member 13 or 14, the flats providing shoulders 27, 27 adapted to abut the adjacent faces of said members for holding the bar in position between them.

To permit radial movement of the wear shoe assemblies in relation to the bars and to limit their inward movement, each end of each block 11 is formed with a radially outer, radially-disposed end face 28, a radially inner, approximately radial end face 29 offset circumferentially from the face 28, and, between and connecting the two radially disposed faces just mentioned, a cylindrically arcuate face 30 complemental to the adjacent surface of the bar or pin 25. The pair of faces 29 embracing each pin 25 are so slightly non-radial as to permit both of the adjacent blocks to move outward and inward with relation to the pin, the two faces 29 of each block being parallel with each other so that excessive play does not result from outward movement of the blocks. The curved faces 30 are adapted to serve as stop faces, against the pin, to limit the inward, disengaging movement of the blocks 11 and their base plates 18, each face 30 and the adjacent face 29 defining a figure of half-arch form.

The projecting portion 19a of each base plate 18 bridges the gap between the block 11 to which it is attached and the adjacent block, on which it is slidable. This construction provides maximum contact area for the bag 12 and yet permits the blocks free radial movement and permits the blocks to be easily removed for replacement of repair without removal of the pins 25.

Modifications are possible without sacrifice of all of the advantages set out in the above statement of objects and without departure from the scope of the appended claims.

I claim:

1. An assembly comprising two relatively rotatable structures, one of the same having an annular frictional-engagement surface, and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, springs for retracting them from said surface and bars for sustaining the torque, each bar bridging the channel of said support and being interposed between the adjacent ends of two of the shoes and having a middle portion of circular cross-section for torque-sustaining engagement with one of the shoes and each shoe being formed with a torque-sustaining surface permitting it to be moved radially with relation to the bar and with a stop surface engaging the bar for limiting the retracting movement of the shoe.

2. An assembly comprising two relatively rotatable structures, one of the same having an annular frictional-engagement surface, and the other comprising a circumferentially arranged set of wear-shoes adapted to coact with said surface, a fluid-distensible member for moving them into engagement with said surface, a rigid, channel shaped support for the fluid-distensible member, and, interposed between said support and the wear shoes, springs for retracting them from said surface and bars for sustaining the torque, each bar bridging the channel of said support and being interposed between the adjacent ends of two of the shoes and having a middle portion of circular cross-section for torque-sustaining engagement with one of the shoes and each shoe being formed with an end face of half-arch form, said face comprising an approximately radial torque-sustaining portion and an arcuate portion engaging the bar for limiting retracting movement of the shoe.

3. An assembly comprising two relatively rotatable structures, one of the same having an annular frictional-engagement surface, and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, springs for retracting them from said surface and bars for sustaining the torque, each bar bridging the channel of said support and being interposed between the adjacent ends of two of the shoes and having a middle portion for torque-sustaining engagement with a shoe and each shoe at each of its ends being formed with an approximately radial surface permitting it to be moved radially with relation to the adjacent bar and with a stop surface engaging the bar for limiting the retracting movement of the shoe.

4. An assembly comprising two relatively rotatable structures, one of the same having an annular frictional-engagement surface and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, bars for sustaining the torque, each bar bridging the channel of said support and being interposed between the adjacent ends of two of the shoes and having a middle portion of circular cross-section for torque-sustaining engagement with one of the shoes and each shoe being formed with a torque-sustaining surface permitting it to be moved radially with relation to the bar and with a stop surface engaging the bar for limiting the retracting movement of the shoe.

5. An assembly comprising two relatively rotatable structures, one of the same having an annular frictional-engagement surface and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, bars for sustaining the torque, each bar bridging the channel of said support and being interposed between the adjacent ends of two of the shoes and having a middle portion for torque-sustaining engagement with a shoe and each shoe at each of its ends being formed with an approximately radial surface permitting it to be moved radially with relation to the adjacent bar and with a stop surface engaging the bar for limiting the retracting movement of the shoe.

6. An assembly comprising two relatively rotatable structures, one of the same having an annular frictional-engagement surface and the other comprising a circumferentially arranged set of wear shoes adapted to coact with said surface, a fluid-distensible member for moving them into engagement with said surface, a rigid, channel shaped support for the fluid-distensible member, and interposed between said support and the wear shoes, bars for sustaining the torque, each bar bridging the channel of said support and being interposed between the adjacent ends of two of the shoes and having a middle portion for torque-sustaining engagement with a shoe and each shoe at each of its ends being formed with an approximately radial surface permitting it to be moved radially with relation to the adjacent bar and with a stop surface engaging the bar for limiting the retracting movement of the shoe, each shoe having secured thereto a base plate adapted to contact the fluid-distensible member and projecting beyond an end of the shoe's adjacent surface.

7. An assembly comprising two relatively rotatable structures, one of the same having an annular frictional-engagement surface and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, bars for sustaining the torque, each bar bridging the channel of said support and being interposed between the adjacent ends of two of the shoes and having a middle portion for torque-sustaining engagement with a shoe and each shoe at each of its ends being formed with an approximately radial surface permitting it to be moved radially with relation to the adjacent bar and with a stop surface engaging the bar for limiting the retracting movement of the shoe, each shoe having secured thereto a base plate adapted to contact the fluid-distensible member and projecting beyond an end of the shoe's adjacent surface and terminating short of the other end of said surface, the said projecting portion of the base plate bridging a gap between the shoe to which it is secured and an adjacent shoe and slidably overlapping the latter.

8. An assembly comprising two relatively rotatable structures, one of the same having an annular frictional-engagement surface, and the other comprising a circumferentially arranged set of wear shoes adapted to coact with said surface, a fluid-distensible member for moving them into engagement with said surface, a rigid, channel shaped support for the fluid-distensible member, and, interposed between said support and the wear shoes, springs for retracting them from said surface and bars for sustaining the torque, each bar bridging the channel of said support and having a middle portion of cylindrical form for torque-sustaining engagement with one of the shoes and being of stepped-down form in both of its end portions to provide in each of said portions an outwardly-facing shoulder unobstructed for reception and removal of a complementally recessed member and the said channel-shaped support comprising two axially separable sections formed with recesses complemental to said end portions of the bars and adapted to be freely assembled and disassembled with relation to the bars by such relative movement lengthwise of the bars as to bring them against and away from said outwardly-facing shoulders of the bars.

THOMAS L. FAWICK.

REFERENCES CITED

The following references are of record in the file of this patent:

UNITED STATES PATENTS

| Number | Name | Date |
| --- | --- | --- |
| 1,723,141 | Down | Aug. 6, 1929 |
| 1,782,566 | Down | Nov. 25, 1930 |
| 2,308,954 | Hatch | Jan. 19, 1943 |
| 2,349,494 | Fawick | May 23, 1944 |
| 2,371,168 | Hawley | Mar. 13, 1945 |
| 1,780,200 | Linderman | Nov. 4, 1930 |
| 2,386,116 | Hunter | Oct. 2, 1945 |